Oct. 23, 1962 D. LYNCH 3,059,337

PRECISION SCRIBING APPARATUS

Filed Aug. 24, 1959 3 Sheets-Sheet 1

INVENTOR.
DAVID LYNCH

BY

RICHARDSON, DAVID & NORDON
ATTORNEYS

Oct. 23, 1962 D. LYNCH 3,059,337

PRECISION SCRIBING APPARATUS

Filed Aug. 24, 1959 3 Sheets-Sheet 2

INVENTOR.
DAVID LYNCH
BY
RICHARDSON DAVID & NORDON
ATTORNEYS

PRECISION SCRIBING APPARATUS

Filed Aug. 24, 1959 3 Sheets-Sheet 3

INVENTOR.
DAVID LYNCH

BY

RICHARDSON, DAVID & NORDON
ATTORNEYS

United States Patent Office 3,059,337
Patented Oct. 23, 1962

3,059,337

PRECISION SCRIBING APPARATUS

David Lynch, 121 King St., Malverne, N.Y.

Filed Aug. 24, 1959, Ser. No. 835,703
8 Claims. (Cl. 33—32)

The present invention relates to precision scribing apparatus and, more particularly, to apparatus for scribing lines located at predetermined positions on a workpiece, the location of each line being quickly determined with a high degree of accuracy.

Scribing apparatus in accordance with the invention greatly simplifies the laying out of templates, drill jigs and similar work involving the scribing of accurately located lines.

An important object of the present invention is to provide a scribing apparatus for accurately locating a single line or a series of lines on a workpiece relative to a reference portion of the workpiece or relative to each other or both.

It is also an object of the invention to provide precision scribing apparatus of this character which is adapted to locate any particular line at a predetermined angle either with respect to an edge of the workpiece or with respect to another line on the workpiece.

A further object of the invention is to provide scribing apparatus capable of quick and easy manipulation, separate coarse and fine adjustments being provided for this purpose.

Briefly, the scribing apparatus according to the invention comprises an accurately rectilinearly guided horizontally movable scriber, rough and fine adjustment means for positioning the scriber for travel along a precisely vertically located horizontal path, and a rotatable plate provided with a protractor scale for supporting a workpiece to be scribed. By turning the workpiece through a measured angle, horizontal movements of the scriber will scribe vertically spaced parallel lines on the workpiece which make accurately measured angles with a series of previously scribed lines. By first scribing one series of lines and then turning the workpiece through 90 degrees, for example, a series of lines perpendicular to the first series may be scribed. This is particularly advantageous when laying out the drilling centers for a group of holes where accuracy of center spacing is important. An accuracy of .001″ in center location is readily quickly obtainable with the present scribing apparatus. An accuracy of .003″ is difficult to obtain and is time consuming when using squares, steel scales, a jeweler's loupe or similar hand methods for locating and scribing lines.

The invention will be more completely understood and additional advantages of the invention will become apparent upon reading the following specification together with the accompanying drawing forming a part thereof.

Referring to the drawing.

Figure 2:
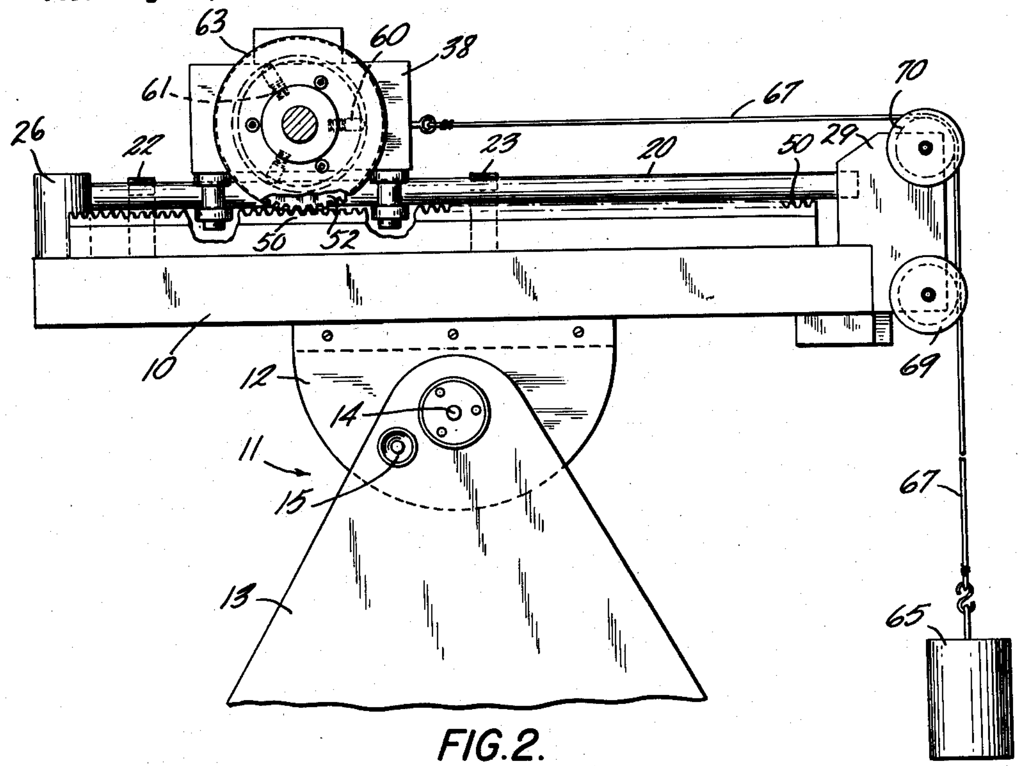
FIG. 2 is an end view in elevation partly in section, taken along the line 2—2 in FIG. 1.

Referring to FIG. 2, there is a baseboard or base 10 which is supported by a tiltable connection designated generally as 11. The connection 11 comprises a substantially rigid plate 12 fixedly attached to the underside of the base 10 and side supports forming a stand 13. An axle 14 suitably journaled in the stand 13 permits the plate 12, and thus the base 10, to be tilted, like a drafting board, to a desired angle for convenience in scribing. When the base 10 has been tilted as desired, a clamping screw 15 is tightened by hand to lock the base 10 firmly in its tilted position.

Figures 1, 5:
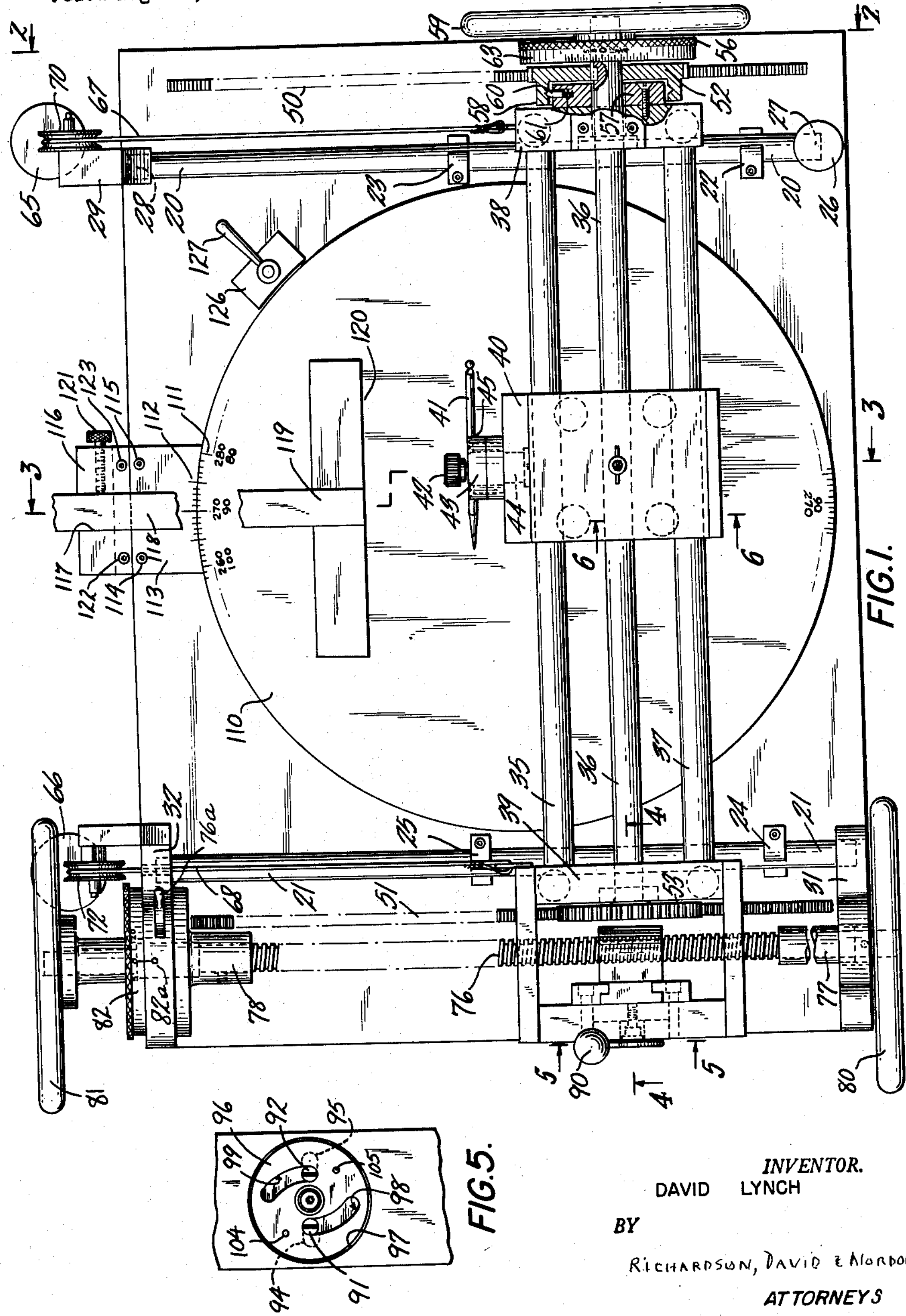
FIG. 1 is a plan view of a preferred embodiment of the invention.
FIG. 5 is a fragmentary end view in elevation taken along the line 5—5 in FIG. 1.

The base 10 serves as a support for the various components of the scribing apparatus. As best seen in FIG. 1, two vertically extending lateral guide bars 20 and 21 are spaced apart and arranged in fixed parallel relation with each other. The guide bars 20 and 21 are supported at spaced locations along their lengths by clamps 22, 23 and 24, 25, respectively which are fastened to the base 10. Each of these clamps 22, 23 and 24, 25 encircles slightly more than half of the circumference of one of the bars 20 and 21 to obtain its holding action and yet provide an uninterrupted smooth guide surface intermediate the ends of each guide bar. However, in addition to the clamps 22, 23 and 24, 25, the guide bars 20 and 21 are further supported at their respective ends by appropriately positioned end blocks. The guide bar 20 is supported at its lower end by a cylindrically shaped block 26 having an opening 27 therein to receive lower end of the guide bar 20. The upper end of the guide bar 20 is supported in an opening 28 in a rectangularly shaped block 29. In like manner the ends of the guide bar 21 are supported by end blocks 31 and 32.

An upper crossbar 35, a shaft 36, and a lower crossbar 37 extend horizontally between two vertically movable plates 38 and 39. The movable plates 38 and 39 are rigidly interconnected by the crossbars 35 and 37. The plates 38 and 39 are supported by precision rollers which engage the uninterrupted guide surfaces of the vertical guide bars 20 and 21. The plates 38 and 39 with their interconnecting crossbars 35 and 37 thus provide a vertically movable carriage which is guided in a precisely rectilinear vertical path of travel by the lateral guide bars 20 and 21. The shaft 36 is journaled in ball bearings mounted in the plates 38 and 39.

Figure 3:
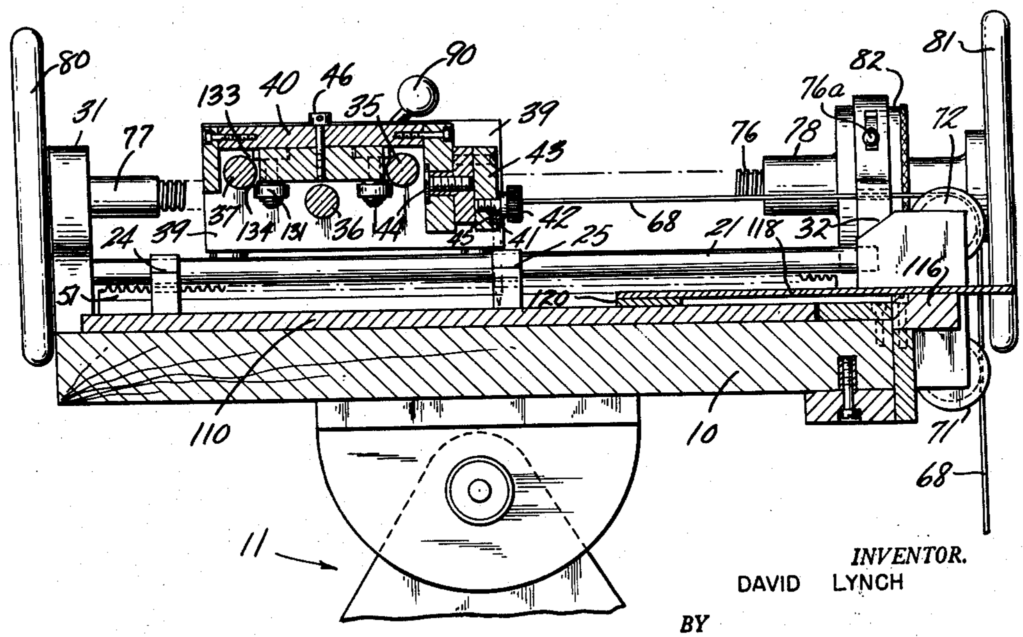
FIG. 3 is a transverse sectional view taken along the line 3—3 in FIG. 1.

The crossbars 35 and 37 serve as horizontal guiding and supporting members for a scriber carriage comprising a main carriage plate 40. The plate 40 is provided with precision roller supports including ball bearings, later to be described, which engage the crossbars 35 and 37. A scriber 41 is clamped by a knurled screw 42 to a circular scriber supporting block 43. The block 43 comprises a cylindrical shank portion by means of which it is freely revolubly mounted on an extension of the plate 40. The shank portion is secured against axial movement by a screw 44 (FIG. 3). The amount of axial play permitted by the screw 44 is as small as possible consistent with free rotary movement of the circular scriber supporting block 43. The scriber 41 is received in a groove 45 formed in the revoluble block 43, being secured therein by the knurled screw 42. By temporarily loosening the screw 42, the position of the scriber 41 may be adjusted longitudinally of the groove 45.

The rough or approximate positioning of the scriber implement 41 longitudinally of the guide bars 20 and 21 is achieved by two gear racks 50 and 51 located adjacent to the guide bars 20 and 21, respectively, and fixedly attached to the base member 10. Cooperating with the racks 50 and 51 are pinions 52 and 53, respectively, which are fixed on the shaft 36, the shaft 36 being rotatably journaled in the movable plates 38 and 39. Therefore, as the pinions 52, 53 and shaft 36 are turned, the crossbars 35 and 37, being attached to the plates 38 and 39, are progressively moved to any desired position along the constrained path permitted by the guide bars 20 and 21.

For rough adjustment of the vertical position of the scriber 41, there is a handwheel 59 which is fixed to the right-hand end of the shaft 36. When the handwheel 59 is turned, the pinions 52 and 53 rotate with the shaft 36 and move the carriage 35—37—38—39 by virtue of the continuous meshing engagement between the pinions 52, 53 and the racks 50, 51.

Friction drag means are provided for holding the scriber 41 in any vertical position to which it has been adjusted by movement of the carriage 35—37—38—39. A circular block 57, which is fixed to plate 38, is surrounded by a collar 58 fixed to the inner side of the pinion 52. Three friction drag pins 60 are slidably arranged in three radial bores formed in the circular block 57. The pins 60 are provided with conically pointed ends which engage in a circular groove of complementary V-shaped cross-section formed in the inner side of the collar 58. The pins 60 are symmetrically arranged with respect to the rotational axis of the shaft 36 which passes freely through the center of the block 57. The drag pins 60 are individually spring-pressed outwardly by separate helical compression springs 61.

A rough scale 63 is mounted on shaft 36 for indicating approximately the vertical position of the scriber 41. The scale 63 is connected to the shaft 36 through friction drag means similar to that described above including the spring-pressed drag pins 60. The scale 63 is provided with a knurled edge portion 56 to facilitate turning the scale 63 by hand while the shaft 36 remains stationary. This is done when setting the rough scale 63 to zero with the carriage 35—37—38—39 stationary. The scale 63 cooperates with an index or reference mark (not visible in the drawing) carried by the plate 38. For purposes of illustration, the scale 63 may be subdivided into graduations of one-eighth of an inch.

In addition to the frictional drag effect of the pins 60, the weight of the movable portion of the device is balanced by two counterweights 65 and 66 which are attached to the ends of cords 67 and 68, respectively. This reduces the amount of frictional drag which must be exerted by the pins 60 to hold the scriber 41 against unintentional vertical movement. As seen in FIG. 2, the cord 67 passes from the counterweight 65, over two pulleys 69 and 70, and is attached at its opposite end to the movable plate 38.

Similarly, the other cord 68 passes from the counterweight 66 over two pulleys 71 and 72 (FIG. 3) and is attached at its opposite end to the movable plate 39.

Fine or precise adjustment of the vertical position of the scriber 41 is achieved by a micrometer screw 76 suitably journaled at its opposite ends in bearings 77 and 78 secured to the base member 10. A locking lever **76*a* is provided on the bearing member 78 for locking the micrometer screw 76 against rotation at certain times as explained in greater detail below. Conveniently, the pitch of the screw 76 may be exactly eight threads to the inch for coordination with the rough scale 63. The micrometer screw 76 is positioned with its longitudinal axis parallel to the axes of the guide bars 20 and 21 and, preferably, is located to the left of the rack 51** as viewed in FIG. 1.

The micrometer screw 76 cooperates with two threaded halves 73 and 74 of a split-nut device, identified generally by the numeral 75. The threads within the nut 75 releasably engage the micrometer screw 76. The nut 75 is fixedly secured to the movable plate 39. Thus, a precise positioning of the scriber 41 is obtained by rotation of the micrometer screw 76 with the split-nut device 75 in its closed position.

As seen more clearly in FIG. 1, the micrometer screw 76 is turned by rotating either the lower handwheel 80 or the upper handwheel 81 disposed at opposite ends, respectively, of the screw 76. Mounted on the micrometer screw 76 and positioned intermediate the bearing 78 and the handwheel 81 is a micrometer scale designated generally as 82. The micrometer scale 82 is connected for rotation with the screw 76 through friction drag means similar to that described above which includes the spring-pressed drag pins 60. There is an index or reference mark **82*a* on the bearing member 78. Thus, with the micrometer screw 76 in any desired position of rotation, the screw 76 may be locked by the locking lever 76*a* and the micrometer scale 82 may be rotated manually without turning the micrometer screw 76 to bring the zero mark on scale 82 into register with the reference mark 82*a***.

Figure 4:
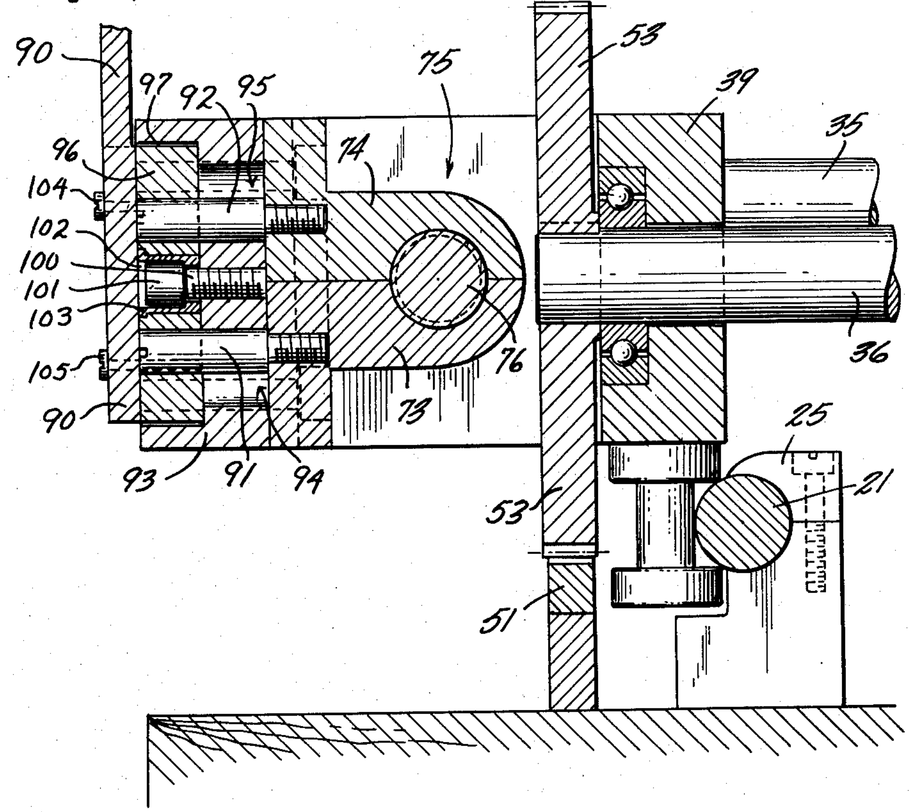
FIG. 4 is an enlarged sectional view in elevation taken along the line 4—4 in FIG. 1.

By rotation of the micrometer screw 76 with reference to the scale 82, the scriber 41 may be displaced vertically through a desired distance with a positively measured high degree of accuracy. As an example, one complete revolution of either handwheel 80 or 81 may move the scriber 41 one-eighth of an inch vertically. The split-nut 75 may be engaged or released at will by actuating the nut control lever 90. Each of the two interiorly threaded halves 73 and 74 of the nut 75 is provided with a pin 91 and 92, respectively, fixed thereto as shown in FIG. 4. A guide block 93, provided with T-slots, slidably supports the nut halves 73 and 74. Two elongated rectilinear slots 94 and 95 are formed in the block 93 to receive the pins 91 and 92, respectively. This is shown in FIGS. 4 and 5.

A revoluble disc 96 is positioned within a recess 97 in the guide block 93 and is provided with arcuate cam slots 98 and 99, to receive the ends of the pins 91 and 92, respectively. The disc 96 is rotatably fastened to the block 93 by a threaded bolt 100 having a head 101 fitting within a recess 102 in the disc 96. To prevent excessive wear, the interior of the recess 102 is provided with a bushing 103 of suitable bearing material. Rotation of the disc 96 is caused by the lever 90 which is secured to the disc 96 by means of screws 104 and 105.

To disengage the split-nut 75, the lever 90 is moved downwardly as viewed in FIG. 1. This movement turns the disc 96 clockwise as viewed in FIG. 5, and the cam slots 98 and 99 force the pins 91 and 92, respectively, apart from each other in the respective straight slots 94 and 95. Moving the pins 91 and 92 apart separates the split-nut halves 73 and 74. This frees the scriber 41 for vertical displacement by the pinions 52 and 53 independently of the micrometer screw 76.

A circular, rotatable work-supporting member 110 (FIG. 1), is mounted on the base member 10. Extending around the periphery of the work-supporting member 110 is a double protractor scale 111 calibrated in degrees both clockwise and counterclockwise. A vernier index 112 is provided on a stationary reference member 113. The reference member 113 has a curved edge which conforms to the curvature of the edge of the circular work-supporting member 110. The reference member 113 is secured to the base member 10 by means of socket head screws 114 and 115.

A guide block 116 having a rectangularly shaped slot 117 is secured to the base member 10 adjacent to the reference member 113. The slot 117 is arranged to receive the elongated shank portion 118 of a T-square 119. The T-square 119 provides a reference edge 120 for accurately positioning a workpiece in the apparatus by engagement with a reference edge of the workpiece. With the T-square 119 in a desired position, a knurled screw 121 is tightened to hold the T-square, thus freeing both hands for carefully and accurately locating the workpiece on work-supporting member 110 relative to the reference edge 120.

After the workpiece has been secured in place, the screw 121 is loosened and the T-square 119 is removed. As shown, the block 116 is fastened to the base member 10 by socket head screws 122 and 123. The work-supporting member 110 may be locked in the particular angular position in which it is set by means of a block 126 movable into frictional engagement with the rim of the work supporting member 110 by a cam lever 127.

Figure 6:
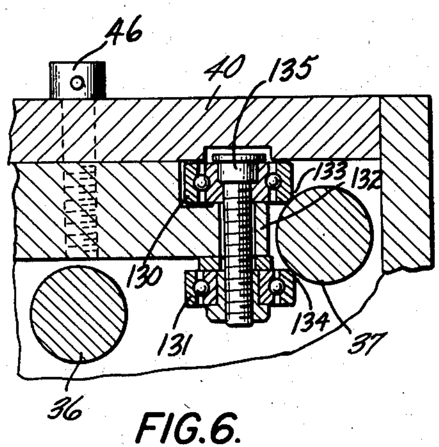
FIG. 6 is an enlarged fragmentary sectional view in elevation taken along the line 6—6 in FIG. 1.

FIGS. 4 and 6 show an H bearing which is formed by two ball bearings 130 and 131 the inner races of which are axially spaced apart by a spacer member 132 and a washer so that the inner edges 133 and 134 of the outer race of each bearing 130 and 131, respectively, engage a cylindrical bar. In FIG. 6, the outer races engage the crossbar 37. A threaded bolt 135 holds the bearing assembly together and causes the inner edges 133 and 134 of each outer race to engage the bar with which it is associated with a minimum of play. As seen in FIGS. 1 and 4 this bearing arrangement is provided for each movable plate 38 and 39 as well as for the guide block 40.

Figure 7:
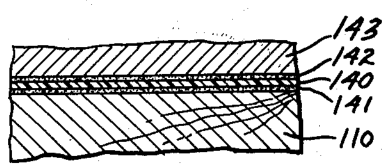
FIG. 7 is an enlarged fragmentary sectional view in elevation showing a preferred means for attaching a workpiece to the apparatus.

FIG. 7 shows a preferred method for securing a workpiece to the work supporting member 110. A length of commercially available plastic tape 140 has both faces coated with a pressure sensitive adhesive as indicated by reference numerals 141 and 142. In this manner, a workpiece 143 is held firmly on the surface of the work-supporting member 110.

In operating the precision scribing apparatus, the T-square 119 is placed in the slot 117 and clamped tightly in desired position by screw 121. This provides an accurate straight edge 120 against which a workpiece is positioned and affixed to the work-supporting surface 110 as by the plastic, double-faced adhesive tape illustrated in FIG. 7. Future angular manipulations of the work-supporting surface 110 are facilitated by first positioning the work-supporting member 110 at some numerically convenient angular position, such as 0, 90 or 120 degrees. Then, if a particular angular displacement is desired, it may easily be added to or subtracted from the initial reading of the vernier index 112. With the workpiece positioned in place, the lever 127 is actuated to clamp the surface 110 tightly and the screw 121 is loosened for removing the T-square. The top edge of the workpiece is now accurately positioned so that it is parallel to the scribing path of the scriber 41.

The nut control lever 90 is now released and the scriber 41 is moved vertically by hand wheel 59 until it is located approximately at the top edge of the workpiece but is so positioned that nut control lever 90 may be moved to its closed position. Then, with the control lever 90 in its closed position, the micrometer screw 76 is rotated by turning either of the handwheels 80 and 81 until the scriber 41 is located accurately at the upper edge of the workpiece. In this position, the scriber 41, when moved horizontally, will travel exactly along the upper edge of the workpiece, thus being located vertically in a zero or reference position.

With the scriber 41 located in this zero position, the micrometer screw 76 is locked by locking lever **76*a* whereby the vertical position of the scriber 41 is fixed. Rough scale 63 is then turned to zero and micrometer scale 82** is also turned to zero.

Suppose, for example, that it is desired to scribe a line which is located .602″ down from the top edge of the workpiece. The desired distance of .602″ consists of rough divisions of ⅛″ or .500″ plus 102 divisions of the 125 divisions on micrometer scale 82. The scriber 41 is moved downwardly by turning handwheel 80 or 81 until the rough scale 63 indicates a little less than ⅝″ and the micrometer 82 reads 102. Alternatively, the split-nut may be opened by lever 90, the scriber 41 moved by turning handwheel 59 until the rough scale 63 indicates ⅝″, the nut closed by lever 90, and the scriber moved by handwheel 80 or 81 until the reading of the micrometer scale 82 is reduced from zero to 102 (by turning backwards through a small fraction of a revolution). To avoid backlash effects, it may be desirable to approach all final readings on micrometer scale 82 from a lower reading. Thus, in the present example, the reading of micrometer scale 82 would be reduced to 90 or 95 and then increased to 102.

Proceeding in this manner, a complete series of accurately spaced horizontal lines may be scribed quickly and with a precision of .001″ or better for the location of each line. Then, by turning the plate 110 through 90 degrees, a series of lines perpendicular to the first set may be scribed. This will provide, at the intersections of certain lines, various accurately located points which may form centers for drilling accurately located holes, for example.

Various changes may be made in the embodiment of the invention which has been shown and described without departing from the spirit and scope of the invention as defined in the appended claims.

What is claimed is:

1. A precision scribing apparatus comprising a base member, fixed guide means supported by said base member to provide a constrained rectilinear path, movable guide means guided by said fixed guide means to define a constrained rectilinear path extending perpendicularly with respect to said first-named path, both of said guide means each comprising a pair of spaced parallel bars of circular cross-section, said movable guide means being guided along said fixed guide means by at least four mutually spaced roller means two of which are spaced longitudinally along one of said bars and which laterally engage a laterally facing portion of one of said bars, two others of said roller means having the same longitudinal spacing along the other of said bars and laterally engaging an oppositely laterally facing portion of said other bar at points directly opposite the points of engagement of said first-named two roller means with said one bar, carriage means guided by said movable guide means, said scriber means being guided along said bars of said movable guide means by at least four spaced roller means arranged like said first-named roller means, all of said roller means each comprising a pair of coaxial ball bearings the inner races of which are fixedly axially spaced with respect to each other and the outer races of which both engage one of said bars at the same longitudinal portion thereof, scriber means supported on said carriage means, means including index means for measured displacement of said movable guide means along said fixed guide means, and work-supporting means adapted to support a workpiece for engagement by said scriber means.

2. Precision scribing apparatus comprising a base member, fixed guide means on said base member, movable guide means guided by said fixed guide means, movable scriber means guided by said movable guide means, both of said guide means together constraining said scriber means to move along precisely rectilinear mutually perpendicular paths, a micrometer screw with its axis parallel to said fixed guide means for displacing said movable guide means along said fixed guide means, index means actuated by rotation of said micrometer screw, said index means including a scale calibrated in units of length for reading the position of said movable guide means along said fixed guide means, friction drag means interposed between said micrometer screw and said index means for permitting said scale to be set to a predetermined reading with said micrometer screw stationary, rotatable work-supporting means carried by said base member for holding a workpiece positioned for scribing by said scriber means, and means including a protractor scale for indicating the angular position of said work-supporting means with respect to the direction of travel of said scriber means along said movable guide means.

3. Scribing apparatus according to claim 2, including releasable means interconnecting said micrometer screw and said movable guide means, said apparatus further comprising rack and pinion means for displacing said movable guide means independently of said micrometer screw and index means connected for displacement with said rack and pinion means, said index means including a scale calibrated in the same units of length as said first-named scale for providing an approximate indication of the position of said movable guide means along said fixed guide means, said micrometer screw having a number of threads per unit of length as indicated on said calibrated scales which provides a reading of an integral number of divisions on the last-named scale for an integral number of revolutions of said micrometer screw.

4. Scribing apparatus comprising a base member, at least one straight guide bar fixed on said base member, at least one movable straight guide bar extending perpendicularly with respect to said fixed guide bar, roller means carried by said movable guide bar and engaging said fixed guide bar, said roller means guiding said movable guide bar for rectilinear movement along said fixed guide bar, a scriber, further roller means engaging said movable guide bar and guiding said scriber means for rectilinear movement along said movable guide bar, a micrometer screw extending parallel to said fixed guide bar, a micrometer head including a micrometer scale connected for rotation with said micrometer screw, releasable connecting means connected to said movable guide bar and engaging said micrometer screw whereby said scriber may be caused to travel along a rectilinear path the position of said scriber longitudinally of said fixed guide bar being indicated by said scale, rough adjustment means for moving said movable guide bar longitudinally of said fixed guide bar with said connecting means released, rotatable work supporting means revoluble about an axis perpendicular to the longitudinal axes of both of said two guide bars, said work-supporting means being adapted to support a workpiece to be scribed by said scriber, releasable means for locking said work-supporting means in a predetermined angular position of rotation, and indicating means for indicating the angular position of said work-supporting means.

5. Scribing apparatus according to claim 4, further comprising freely revoluble holding means interposed between said scriber and said further roller means, said holding means supporting said scriber for rotation about an axis parallel to the longitudinal axis of said fixed guide bar, and variably spaced therefrom at a constant distance from said work-supporting means.

6. Scribing apparatus comprising a base member, a work-supporting member revolubly secured to said base member, protractor means for measuring the angular position of rotation of said work-supporting member, two spaced elongated guide members fixed to said base member, said fixed guide members having parallel longitudinal axes which are both perpendicular to the rotational axis of said work-supporting member, roller means movably engaging said fixed guide members, said fixed guide members constraining movement of said roller means to a precisely rectilinear path perpendicular to said rotational axis, two elongated movable guide members carried by said roller means, the longitudinal axes of said movable guide members being mutually perpendicular to the longitudinal axes of said fixed guide members and said rotational axis, further roller means movably engaging said movable guide members, said movable guide members constraining movement of said further roller means to a precisely rectilinear path parallel to the longitudinal axes of said movable guide members, rotatable scriber supporting means carried by said further roller means, said scriber supporting means being revoluble about an axis parallel to the axes of said fixed guide members, a scriber carried by said scriber supporting means for movement over said work-supporting means, a micrometer screw having its rotational axis parallel to the axes of said fixed guide members, nut means connecting said movable guide members for displacement by rotation of said micrometer screw, and a cylindrical index scale connected for rotation with said micrometer screw for measuring the position of said scriber along a direction parallel to the longitudinal axes of said fixed guide members.

7. Scriber apparatus according to claim 6, further comprising means for selectively releasing said nut means at will to free said movable guide members for displacement independently of said micrometer screw, a freely revoluble shaft carried by said further roller means along with said movable guide members, two rack members fixed to said base member and extending parallel to said fixed guide members, two pinions fixed to said shaft and meshing with said rack members, manually operable means for rotating said shaft with said nut means released, and an index scale connected to said shaft for indicating the angular position of said shaft, said last-named index scale being calibrated to give an approximate measurement of the position of said scriber along said direction parallel to the longitudinal axes of said fixed guide members.

8. Scriber apparatus according to claim 7, further comprising a plurality of separate friction drag means through which each of said index scales is individually displaced whereby each scale may be independently set to zero without displacement of said scriber.

References Cited in the file of this patent

UNITED STATES PATENTS

| | | |
|---|---|---|
| 977,829 | Ourdan | Dec. 6, 1910 |
| 1,615,668 | Anderson | Jan. 25, 1927 |
| 2,191,109 | Kittredge | Feb. 20, 1940 |
| 2,219,783 | Matson | Oct. 29, 1940 |
| 2,357,206 | Klages | Aug. 29, 1944 |
| 2,451,931 | Edelmann | Oct. 19, 1948 |
| 2,468,325 | Eisele | Apr. 26, 1949 |
| 2,908,079 | Barrett | Oct. 13, 1959 |